United States Patent [19]
Anderson et al.

[11] Patent Number: 5,940,491
[45] Date of Patent: *Aug. 17, 1999

[54] CONTROL OF TELECOMMUNICATIONS NETWORKS

[75] Inventors: Thomas Wayne Anderson; Alan Eugene Frey; Michael Neal Meyers, all of Naperville, Ill.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/609,161

[22] Filed: Feb. 29, 1996

[51] Int. Cl.$^6$ .............................. H04M 7/00; H04M 3/42; H04L 12/50; H04Q 11/00
[52] U.S. Cl. .......................... 379/230; 379/210; 379/220; 379/222; 379/243; 379/258; 370/351; 370/385; 370/386; 370/388; 370/389; 370/395
[58] Field of Search ................................. 379/67, 88, 89, 379/230, 242, 243, 220, 222, 229, 258, 210; 370/351, 385, 386, 388, 389, 395

[56] References Cited

U.S. PATENT DOCUMENTS

| | | |
|---|---|---|
| 4,827,499 | 5/1989 | Warty et al. .............................. 379/58 |
| 5,329,308 | 7/1994 | Binns et al. .............................. 348/14 |
| 5,418,844 | 5/1995 | Morrisey et al. ....................... 379/207 |
| 5,541,917 | 7/1996 | Farris ..................................... 370/60.1 |
| 5,583,920 | 12/1996 | Wheeler, Jr. ............................. 379/88 |
| 5,638,364 | 6/1997 | Sugita ..................................... 370/397 |
| 5,712,903 | 1/1998 | Bartholomew et al. .................. 379/89 |

*Primary Examiner*—Fan S. Tsang
*Assistant Examiner*—Allan Hoosain
*Attorney, Agent, or Firm*—Werner Ulrich

[57] ABSTRACT

Apparatus and method for controlling establishment of telecommunications call connections in a telecommunications network. The network comprises a plurality of switches each with its own switching processor means, and a plurality of switching processing platforms each comprising at least one call processor. The switches and switching processing platforms are interconnected by a data network. SS7 signaling messages are received in one of the platforms and a call is assigned to a call processor. The call processor communicates with one or more switching processor means for controlling establishment of the call. Call features are processed under the control of the call processor. Advantageously, any call processor can be used for serving any call in the network and can control all legs of a multi-leg connection. Advantageously, in a large network, the number of platforms may be significantly less than the number of switches which reduces the cost and complexity of administration of the network.

20 Claims, 7 Drawing Sheets

CONTROL OF TELECOMMUNICATIONS NETWORKS

RELATED APPLICATION

This invention is related to T. W. Anderson et al.: "Merging the Functions of Switching and Cross Connect in Telecommunications Networks" being filed concurrently and being assigned to the assignee of this application.

TECHNICAL FIELD

This invention relates to the methods and apparatus for controlling a telecommunications network comprising a plurality of individual telecommunications switching systems.

PROBLEM

The last several decades have continued to see a sharp increase in the amount of telecommunications traffic, especially that carried by the larger toll networks. Networks, such as AT&T's toll network, cover a large area and require a substantial number of nodes just to reach the local and tandem switches to which they are connected. To add further nodes, just in order to handle additional traffic, is very costly; each additional node in the AT&T toll network adds substantial costs for operation, administration, maintenance, and provisioning for added interconnectivity, and for the separate operation of the switches in each node.

The capacity of a node is determined by the circuit capacity of the switches in the node, the capacity being limited by the number of terminations that can be supported by the node and by the traffic handling capacity of the processor system for controlling the node. Modern telecommunications services require larger and larger amounts of data processing for handling each call in order to allow custom services, whose implementation may depend on data concerning both the calling and the called parties, to be offered. Implementation of such services is a necessity in a competitive market. Further, the larger the node, the higher the required reliability.

A problem of the prior art is the limitation on the size and reliability of the nodes of a telecommunications network because of limitations brought on by the data processing capacity and reliability required to offer modern telecommunications service.

SOLUTION

The above problem is considerably alleviated and an advance is made over the prior art in accordance with applicants' invention wherein the network is broken down into a plurality of switching fabric systems (switches), each with fabric control processors for performing basic functions (establishing connections between terminals of the switch, connecting announcements to a terminal of the switch, and, in applicants' specific embodiment, performing a busy test and a hunt for an available trunk in a trunk group); the control for the services of a call and the control of decisions as to which connections are to be made is relegated to a separate group of switching processing platforms (SPPs); the SPPs and switches are interconnected by a high-speed data communications network such as an ATM (asynchronous transfer mode) network. Advantageously, an SPP can control a call in a plurality of switches from an ingress node to an egress node of the network. Advantageously, this permits a single control process in a single SPP to control the entire connection from ingress to egress. Advantageously, a small number of SPPs simplifies administration. Advantageously, reliability is enhanced since a plurality of SPPs can control calls of one switch.

In accordance with applicants' preferred embodiment, trunk hunts for a trunk in a specified trunk group or set of trunk groups are performed in an individual switch. Advantageously, the dynamically changing record of which trunks are available is maintained in only one location, thus simplifying updating of this record.

In accordance with one preferred embodiment, incoming CCS7 initial address messages are routed over a SS7 network to one of the SPPs. The call is assigned to a call processor in any of the SPPs and this call processor receives the data from the initial address message over an intra-SPP or inter-SPP ATM signaling network. The call processor then accesses an appropriate data base in any of the SPPs, to obtain the translation data for the called number and, if necessary, the calling number. The call processor then signals to the ingress and egress switches of the network to request a connection between the incoming trunk and the egress trunk or destination directly connected to the egress switch. The ingress switch and the egress switch identify trunks used to interconnect these switches to the call processor, which then sends commands to these switches and any intermediate switches of the connection to establish the connection between ingress and egress switches, and to connect the incoming and egress trunk or destination. Trunk hunting and the selection of an intermediate switch, if necessary are performed in the conventional manner of the prior art.

The egress switch has the responsibility for selecting an egress trunk within a trunk group, specified by the call processor. The ingress and egress switches have the responsibility for selecting the intra-network trunk groups and for performing the routing required within the network, as prescribed for example to implement real time network routing described, for example, in U.S. Pat. No. 5,101,451. Each switch has the responsibility for establishing connections within the switch. Advantageously, this arrangement avoids the necessity for shipping large amounts of data to the call processor and for avoiding race conditions. The switch also administers service circuits, such as digit receivers and announcements systems, and monitors all connections in order to discover disconnects and request disconnect action from the call processor. If the switch collects digits, these digits are forwarded to the call processor for further processing.

DETAILED DESCRIPTION

Figure 1:
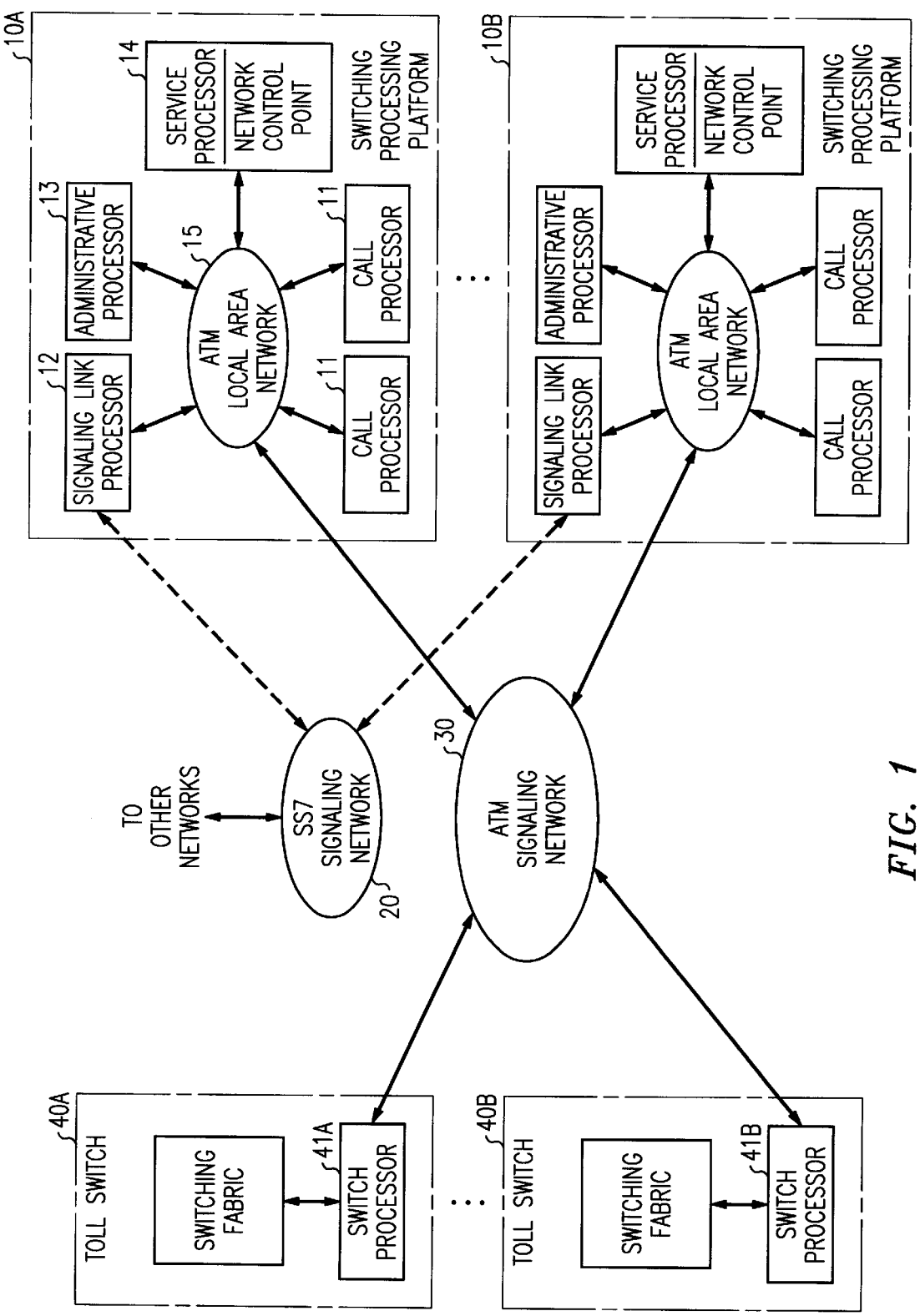
FIG. 1 is a block diagram of an illustrative embodiment of applicants' invention.

FIG. 1 is a block diagram illustrating the operation of applicants' invention. Blocks 10A, . . . , 10B are Switching Processing Platforms (SPPs) for controlling a large network such as the AT&T Toll Network. The switches of the toll network are toll switches 40A, . . . , 40B. In the preferred embodiment, these switches are pulse code modulation (PCM) switches, but in alternative embodiments, these switches can be analog or ATM switches. The SPPs are interconnected by and connected to a signaling network 20 which transmits signaling system 7 (SS7) signaling message. Each SPP contains a plurality of call processors (CP) 11, a signaling link processor (SLP) 12, an administrative processor (AP) 13, and, optionally, a service processor/network control point (SP/NCP) 14, which usually includes a data base; these are interconnected by an ATM local area network ATM/LAN 15. Note that while the diagram shows a single signaling link processor in each SPP, these processors can also be duplicated so that at least two such processors exist for reliability. The administrative processor is used to take measurements and to control the changes in the data stored in databases of the call processors. The database of the administrative processor also contains back up data for initializing any call processor. The toll switches and the ATM local area networks are interconnected by an ATM signaling network 30.

The SS7 signaling network 20 also communicates with networks outside the toll network such as local networks. The arrangement makes it possible for any call processor to serve a call on any switch or any plurality of switches of the toll network. The use of an ATM signaling network, which, with modern technology, can transmit signaling messages very rapidly, makes it possible to exchange many messages between a call processor and the fabric processors of the toll switches for a single call, and also makes it possible for a call processor to access data in any database of any SPP rapidly. The control system is therefore, very robust, since any call processor in any of the SPPs can control a call and can obtain information from any database in its own SPP or other SPPs.

The operation of a call is illustrated in the following description. An initial address message (IAM), the first signaling message announcing the arrival of a call on an incoming trunk, is received in the SS7 signaling network 20 and is steered by this network to an appropriate signaling link processor (SLP) 12 in one of the SPPs. The selection of a call processor by that SLP is based on the availability of both capacity and feature functionality in each call processor across all SPPs, and can be influenced by the location of the CP in order to minimize the number of remote data accesses for a particular call and to minimize the elapsed time for transmitting control messages between the CP and switch processors. The signaling message is transmitted by the initial signaling link processor 12 to the selected call processor 11 via the ATM network 30, if necessary, and the ATM/LAN 15 of that SPP. The call processor accesses data from its own database or, if necessary, the database of its own SP/NCP 14 or the SP/NCP of another SPP, and, based on the information obtained, makes a decision to select an egress destination of the toll network for connection to the incoming trunk associated with the initial address message. An egress destination in this case is specified by a terminating directory number.

The toll switch which is connected to the incoming trunk is identified by information in the IAM. In the preferred embodiment, the call processor selects an egress switch, and an egress trunk group or a route index for selecting a preferred trunk group and alternate trunk groups. In the preferred embodiment, the selection of an outgoing trunk, and, if the outgoing trunk is not connected to the incoming toll switch, the selection of the toll network path used for reaching the toll switch connected to the outgoing trunk, is made under the control of the toll switches. These switches have up to date information concerning availability of outgoing trunks and inter-switch trunks, information which it would be difficult to make available to all call processors in a timely and readily accessible fashion.

Thus, the process of selecting an outgoing trunk and, if necessary, an intermediate switch within the toll network is performed under the control of the switch processors 41A, . . . , 41B of the toll switches. These fabric processors communicate with each other over the ATM signaling network 30 in order to select trunks for reaching the egress toll switch and the egress toll switch selects the outgoing trunk. Alternatively, the fabric processors can communicate with each other over the SS7 network to be consistent with the prior art arrangements. In the preferred embodiment, the principles of real time network routing, as described in U.S. Pat. No. 5,101,451, are used to select a path within the toll network. The toll switches communicate with each other over the ATM signaling network 30, and send messages over the ATM signaling network to the controlling call processor which requests that its associated signaling link processor transmit the appropriate SS7 message over SS7 network 20 to a switch in the connected network.

While in the preferred embodiment any call processor can handle any call, certain economies can be obtained if individual call processors are restricted to processing calls originating in a subset of the toll switches of the network. For example, in a geographically large network, it is desirable that call processors process calls of switches that are relatively close in order to minimize the delay introduced by transmitting message between processors and switches.

The switch processors such as 41A and 41B of the toll switches are responsible for fabric control. This includes the control of hardware diagnostics, fault management, and other maintenance actions related to the network fabric; the management of trunks including maintenance of the state of the trunks and control of the maintenance of the trunks; routing translations, path hunts, and selection of paths when a connection within the network requires two or more switches; management of service circuits, including providing announcements; collecting digits which are signalled outside the SS7 protocol; establishing conference connections; and monitoring existing connections to detect additional control signals. The switch processor is also responsible for establishing a connection between network endpoints with special connection attributes as defined by class of service. Examples include 64 kilobit clear data (as opposed to voice), and calls routed only over cable trunks (as opposed to microwave) to achieve more secure communication.

The service logic, which is implemented under the control of the call processor, is responsible for controlling connections to one or more end points and managing user services on these connections. Effectively, each channel between a switch and a network endpoint can be thought of as a conference port; the service logic is then the conference controller. Specifically, the service logic performs all service related (as opposed to routing related) digit translations, performs the call processing for basic calls, performs the translation and class of service requirements of 800 and advanced 800 calls; controls software defined networks; and controls network services that are based on the caller as well as the called telephone number.

Figure 2:
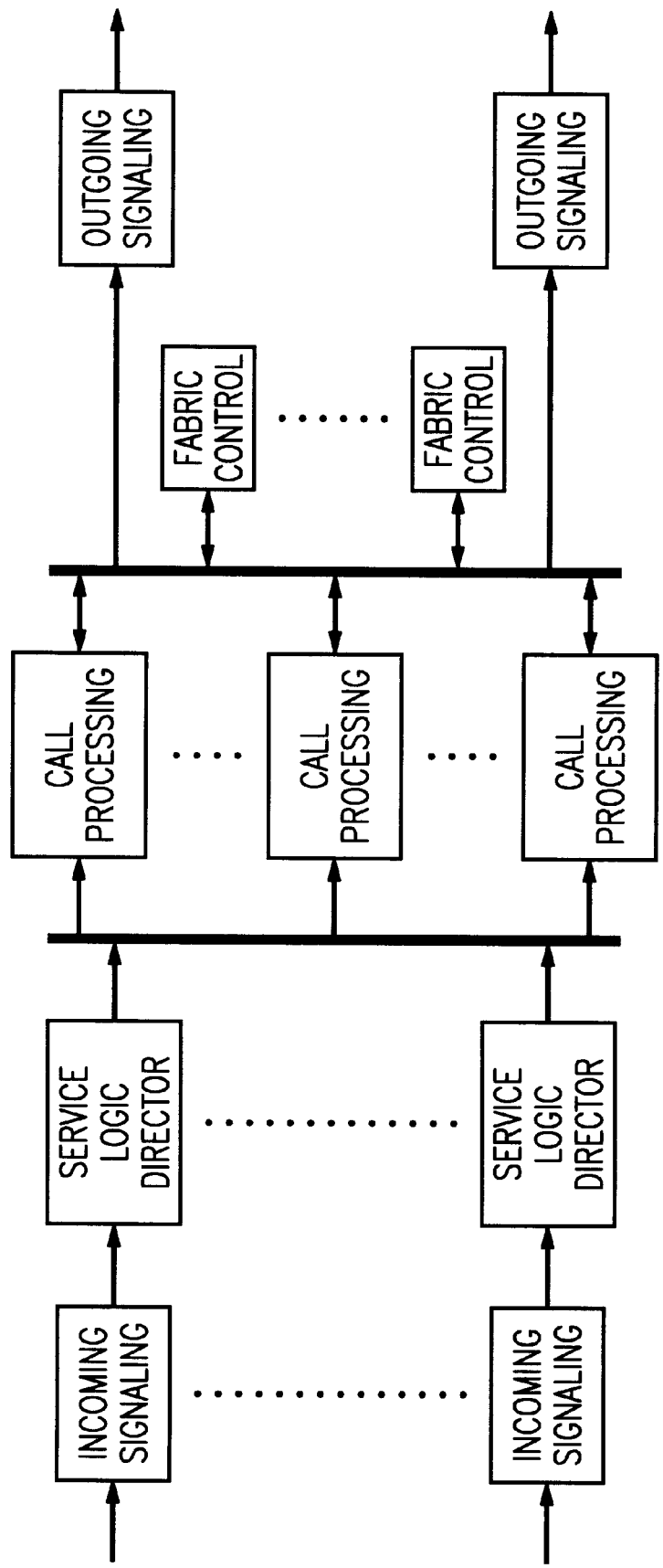
FIG. 2 illustrates the call control flow.

FIG. 2 is a functional overview applicants' invention. Incoming signaling is directed to a service logic director (the signaling link processor) which, based on the called or routing number (such as the POTS number corresponding to an 800 number) and the calling customer's directory number, as identified by automatic number identification (ANI), selects a call processor for serving that call. For example, a set of specialized processors might process all 800 calls. The call processor communicates with the switch processors (the processors of the toll switches). The call processors and the fabric control processors generate outgoing signaling messages for transmission to a terminating network. The load on the call processors is a primary factor influencing the choice of a specific call processor in a group.

Figure 3:
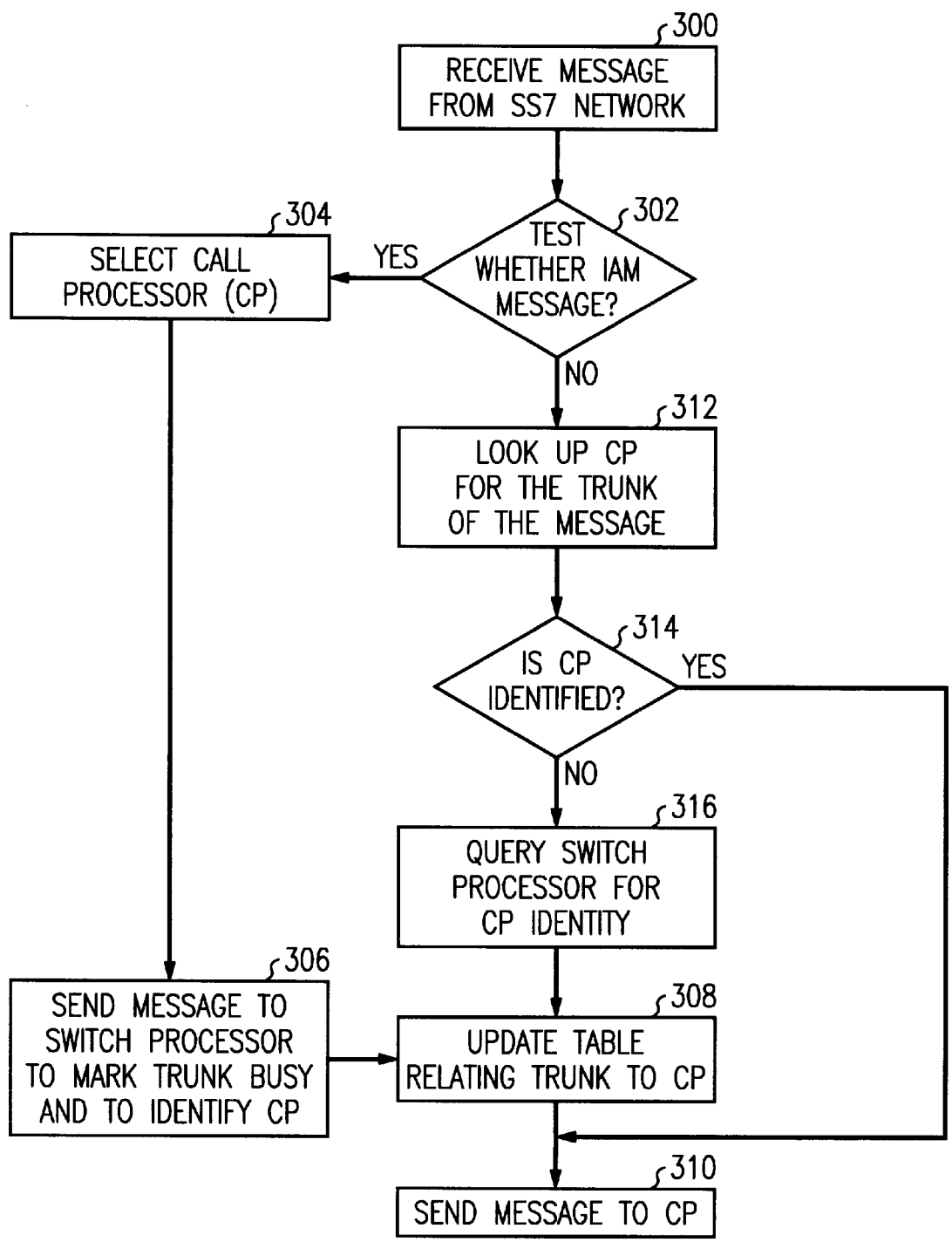
FIGS. 3–9 are flow diagrams of actions performed by the signaling link processors (SLPs), switch processors, and call processors (CPs).
Figure 4:
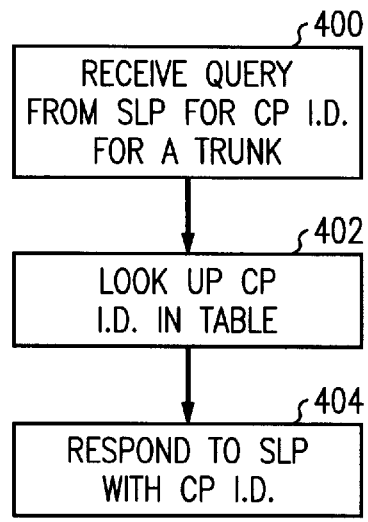

FIG. 3 is a flow diagram illustrating the operation of the signaling link processor (SLP) required to implement this embodiment of applicants' invention. The SLP receives a message from the signaling system 7 (SS7) network (action block 300). The SLP tests whether this is an initial address message (IAM)(test 302). If this is an IAM message, then the SLP selects a call processor for processing the call represented by the IAM (action block 304). In doing the selection, the SLP takes into account such factors as the load on the various CPs, the physical proximity of a CP to the switch containing the trunk for which the IAM was received, special characteristics of the call which might require that the call should be processed by a specialist CP (for example, if 800 calls were assigned to a group of specialist CPs). Also, it is desirable to use a CP in the same SPP as the SLP. The SLP sends a message to the processor of the switch serving the trunk for which the IAM was received to identify to that switch the CP which has been selected and to mark that trunk busy (action block 306). The SLP updates its table relating individual trunks to the CP serving calls for that trunk (action block 308). The SLP then sends the IAM to the CP and activates the CP for that call (action block 310).

If the result of test 302 is to indicate that this is not an IAM message, then the SLP looks up the identity of the CP which is handling the call to which the message pertains by looking up the identity of the CP for the trunk of the message (action block 312). Test 314 checks whether the CP is in fact identified in the table of trunks of the SLP. If so, then the SLP sends the message received in block 300 to that CP (action block 310). If the CP is not identified (negative result of test 314) then the SLP queries the switch serving the trunk for which the message has been received in order to get the identity of the CP from that switch (action block 316). This could happen if the SLP which was receiving messages for the trunk failed, in which case a different SLP will begin receiving messages for the trunk. When the SLP receives the identity of the CP from the switch processor, action blocks 308 and 310 are executed as described above.

FIGS. 4–7 are flow charts of actions performed by the switch processor serving a trunk for which the SLP is receiving messages. Action block 400 indicates that the switch processor has received a query from the SLP for the identity of the CP serving the call carried over a particular trunk. (This is the query sent by the SLP in action block 316 of FIG. 3). The switching processor looks up the identity of that CP in a table using the identity of the trunk to enter the table (action block 402). The switch processor then responds to the SLP with the identity of the CP (action block 404).

Figure 5:
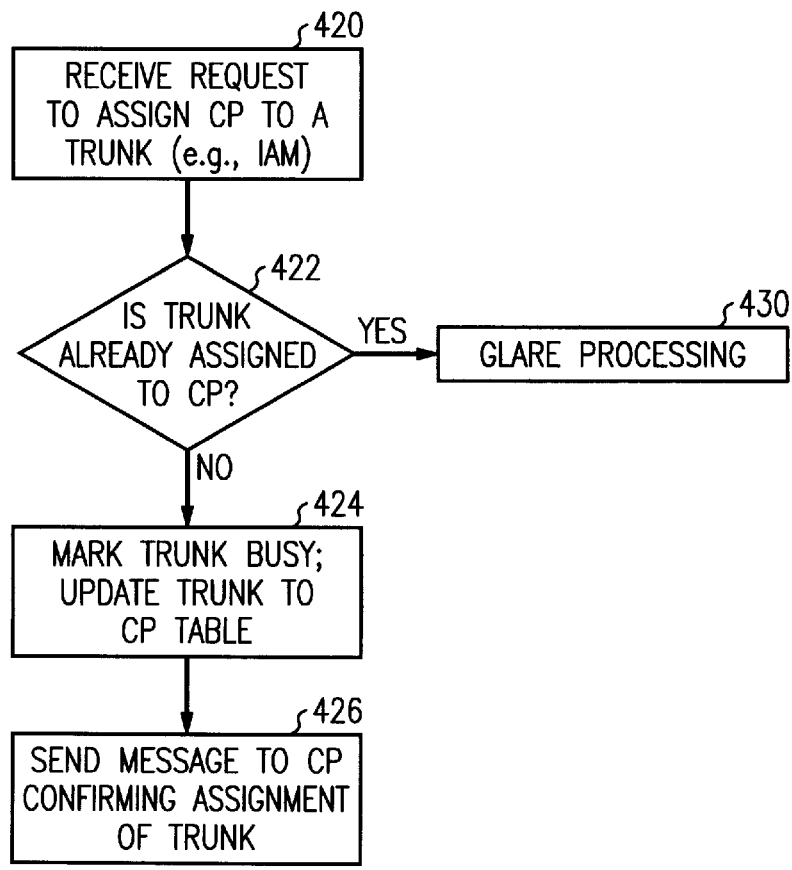

FIG. 5 illustrates the actions performed in response to receiving a request to assign a specific CP to a trunk, the request being received from an SLP. The request is received (action block 420) via the message transmitted by an SLP in action block 306 ((FIG. 3) previously described). Test 422 checks whether the trunk is already assigned to a CP. If not, then the trunk is marked busy and the trunk to CP table is updated (action block 424). The switch processor then sends a message to the CP confirming assignment of that CP to that trunk (action block 426). If the trunk has already been assigned to a CP, this is an indication of a "glare" situation (action block 430). This situation occurs when the two ends of a trunk are seized almost simultaneously. In the preferred embodiment of this invention, this situation is handled by assigning a preferred end to each trunk for which a glare may occur (a glare would not occur on a one way trunk). If the glare is found on the preferred end, the switch processor sends a message to the call processor which was selected to process the IAM received for the trunk indicating the trunk cannot be used for this call and to discard the IAM. The switch at the other end will then hunt for another trunk or route the call to overflow. If the glare if found on the non-preferred end, the switch processor frees up the previous connection reserved for this trunk, and sends a message to the call processor that had previously seized that trunk for an outgoing call to indicate that this trunk can no longer be used for that call and that the call processor needs to request a hunt for another trunk or to route the call to an overflow tone. The switch processor updates the trunk to CP table with the identity of the CP which was selected to process the IAM received for this trunk, and sends a message to that CP confirming assignment of that CP to that trunk.

Figure 6:
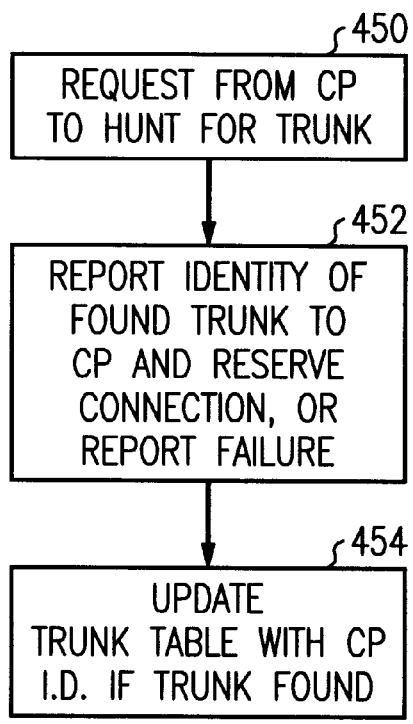

FIG. 6 is a flow diagram illustrating the process of selecting a trunk for establishing a call. This selection is carried out by the switch processor in accordance with applicants' preferred embodiment. The call processor analyzes the called number and using office code translation, derives a routing index which represents a list of trunk groups or an identity of an egress switch which is used by the switch processor for selecting a trunk (action block 450). The list can contain trunk groups for exiting the network which are connected to an end office or a tandem office for reaching such an end office; or an identity of an egress switch in the toll network, so that the switching processor can select a direct trunk to this egress switch or a trunk to an intermediate switch of the toll network (in conformance with the principles of real time network routing as described in the previously referenced patent). The switch processor, after having found a trunk, reports to the call processor the identity of the found trunk, and reserves a connection to that found trunk, or, if necessary, reports a failure for the call processor to take other actions toward completing the call or toward returning overflow tone (action block 452). The connection is reserved rather than being established so that a full connection is reserved until an answer signal is received at which time a reserved connection is converted into an actual connection. The switch processor updates the trunk table with the identity of the call processor if a trunk has been found (action block 454).

Figure 7:
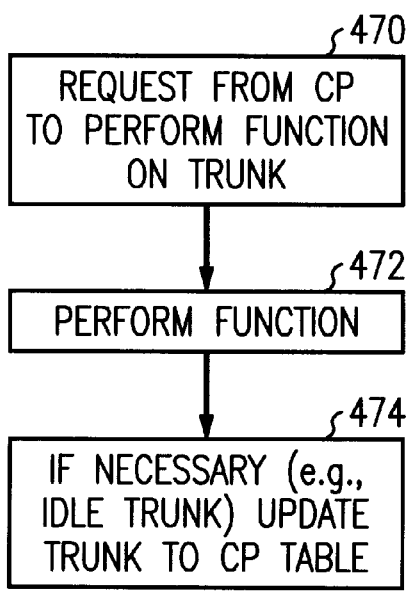

FIG. 7 is a flow diagram describing actions performed by the switch processor to perform some kind of function on or for a trunk (action block 470). A request is received from the call processor to perform a function on that trunk. The function may be the establishment of the connection to the trunk within the switch the connection having been previously reserved. This is the function performed in response to an answer signal received from the end office of the call. Another function is the playing of an announcement on a trunk and the collection of digits dialed by the customer in response to the announcement. The switch processor performs the function on or for the trunk (action block 472) and, if necessary, for example, if the request is to idle a trunk, updates the trunk to table to indicate that the trunk is now idle, i.e., not associated with a CP (action block 474).

Figure 8:
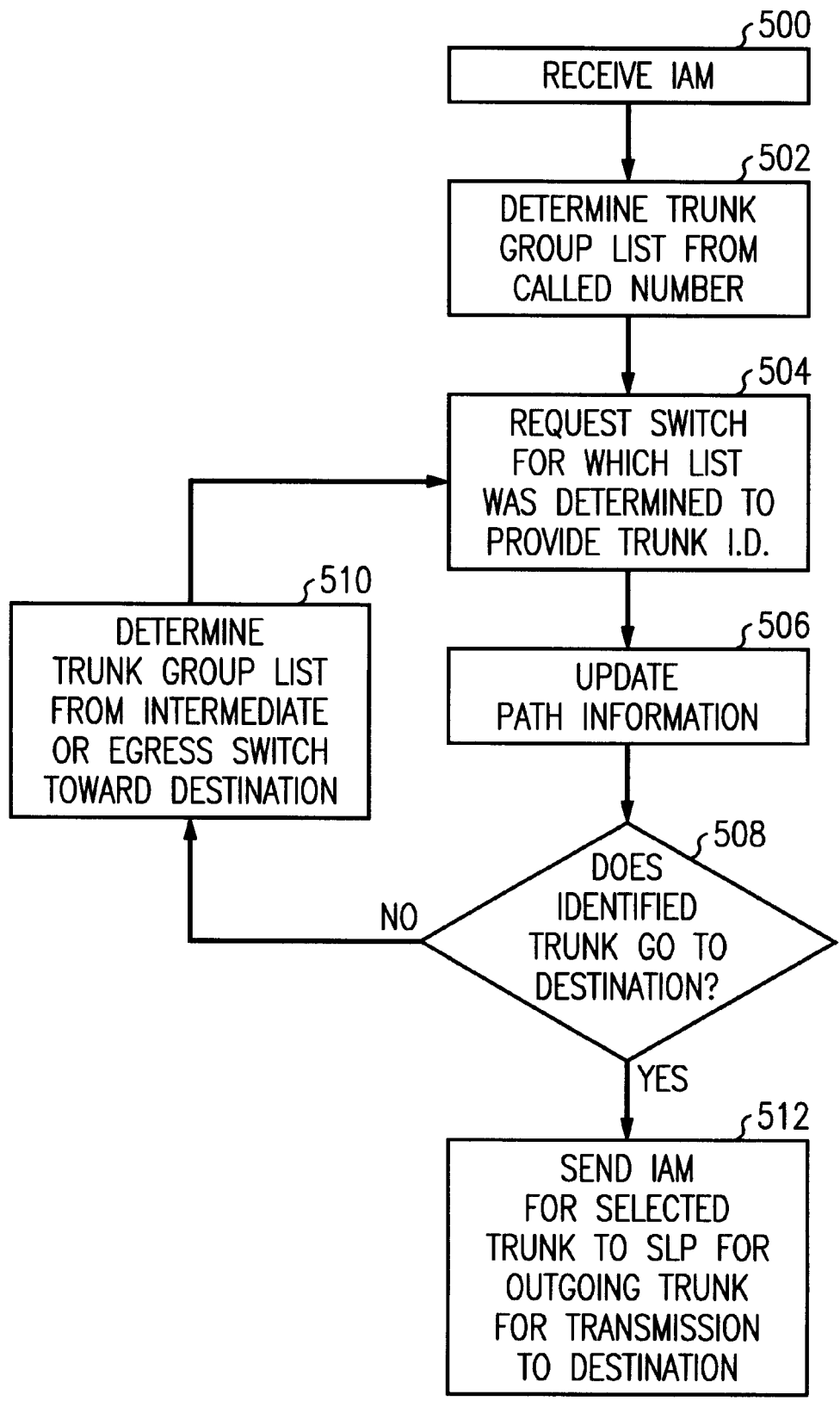

FIG. 8 is a flow diagram of actions performed in a call processor in response to receiving an IAM from an SLP (action block 500). The call processor determines a trunk group list from the called number for the switch serving the trunk for which the IAM was received (action block 502). The CP then requests (action block 504) the switch for which a list was determined to provide the identity of a trunk found in response to the hunt request of 450 as reported by action block 452 (FIG. 6). The CP then updates path information for the call to indicate that a path has been reserved between the trunk of the IAM and the trunk whose identity was provided by the switch processor of the IAM trunk (action block 506). Test 508 tests whether the identified trunk is an egress trunk of the toll network or goes directly to the destination. If not, then the CP determines a list of trunk groups from an intermediate or egress switch toward the destination (action block 510) and the actions of action blocks 504 and 506 and test 508 are repeated. Eventually, the result of test 508 will be positive, i.e., the identified trunk leaves the toll network; then, the CP requests an SLP for the outgoing trunk to send the IAM to the switch connected to the outgoing (egress) trunk (action block 512).

Figure 9:
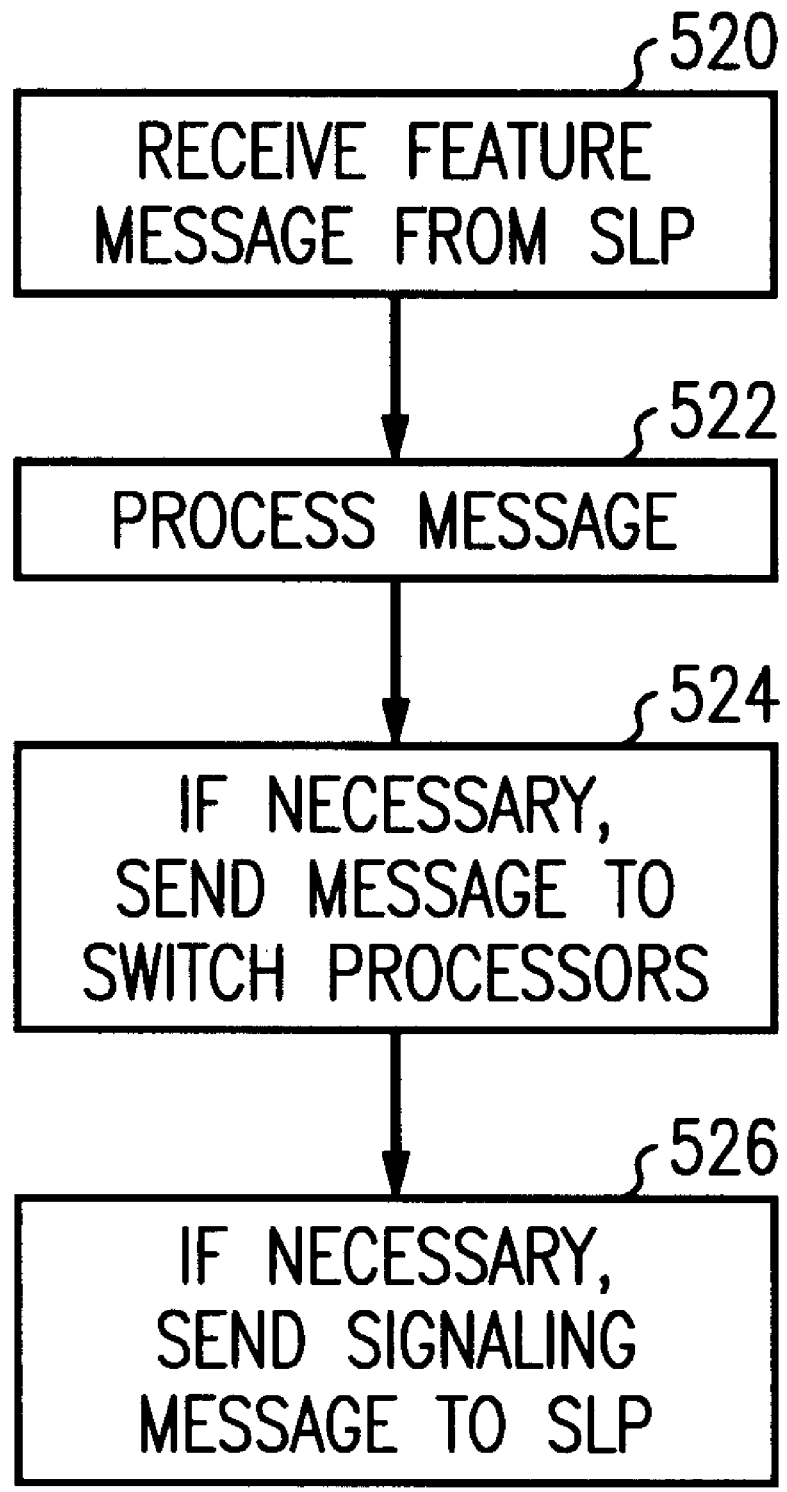

FIG. 9 illustrates the actions performed by the CP in response to receiving a feature message from an SLP (action block 520). The feature message may be a message indicating a call answer, requesting the addition of another leg to the call, requesting to send information to either party (for example, for identifying the other party), or requesting the playing of an announcement for soliciting customer dialed or spoken information. The feature request message is processed by the CP (action block 522) and the CP, if necessary, sends a message to one or more switch processors to request the actions necessary to carry out the requested feature (action block 524); if necessary, a signaling message is sent to the SLP to signal another switch outside the toll network in order to accommodate the feature (action block 526).

We claim:

1. Apparatus for controlling establishment of call connections in a telecommunications network, comprising;
    a plurality of SPPs (switching processing platforms);
    a plurality of switches, each comprising a switching fabric, and switching processor means responsive to receipt of connection request messages from a call processor for establishing a call connection between lines or trunks in said switching fabric;
    data network means for sending only signaling and control messages, and no voice band signals interconnecting said plurality of SPPs with the switching processor means of said plurality of switches;
    said plurality of SPPs includes within them a plurality of at least three CPs (call processors) spread over at least two SPPs;
    each of said plurality of SPPs comprising at least one call processor;
    said plurality of SSPs comprising means for assigning any of said plurality of CPs to be the one of said CPs for controlling a call;
    said plurality of SPPs comprising at least two signal link processor (SLP) means for receiving all trunk signaling messages for a call and transmitting said received signaling messages for said call to said one of said CPs;
    said one of said CPs for generating said connection request messages for transmission over said data network means, to ones, one or two, of said switching processor means, for establishing said call connection within one of said plurality of switches and or for establishing interoffice call connections between two of said plurality of switches;
    said one of said CP's for maintaining a control state and retaining control from origination or seizure until disconnect for said call, and for all calls controlled by said one of said CPs.

2. The apparatus of claim 1 wherein said plurality of SPPs comprises a plurality of signaling link processors for receiving signaling messages for a call.

3. The apparatus of claim 2 wherein said plurality of SPPs comprises a plurality of administrative processors for controlling operations administration and maintenance of said telecommunications network.

4. The apparatus of claim 2 wherein said plurality of SPPs comprises at least one SP/NCP (service processor/network control point) for providing data for control of specialized telecommunications calls.

5. The apparatus of claim 1 wherein said plurality of switches comprise a plurality of PCM (pulse code modulation) digital switches.

6. The apparatus of claim 1 wherein said plurality of switches comprises a plurality of ATM (asynchronous transfer mode) switches.

7. The apparatus of claim 1 wherein said data network means comprises an ATM (asynchronous transfer mode) network.

8. The apparatus of claim 7 wherein said data network comprises a plurality of ATM/LANs (ATM local area networks) each for interconnecting the processors of one of said SPPs and for connection to an inter SPP data network.

9. The apparatus of claim 1 wherein said CP determines an identity of an outgoing trunk group for connection of said call to a terminating network.

10. The apparatus of claim 9 wherein said switching processors means control the selection and establishment of connections within said network.

11. The apparatus of claim 1 wherein a call on a trunk can be assigned to one of a plurality of CPs, said plurality of CPs comprising at least one CP in each of at least two SPPs.

12. The apparatus of claim 1 wherein said one of said CPs generates connection request messages for transmission to switching processors of an ingress and an egress switch of said telecommunication network for establishing a call connection across said telecommunications network.

13. The apparatus of claim 1 wherein said CPs control essentially all call connections of said telecommunications network.

14. The apparatus of claim 1 further comprising the step of:
    said CP's receiving all trunk related common channel signaling messages for controlling the processing of said call.

15. In a telecommunications network, a method of establishing a call connection comprising the steps of:
    receiving call setup request trunk signaling messages for a call between lines, or trunks of said network in one of a plurality of SPPs (switching processing platforms), comprising a SLP (signaling link processor) of said network, said messages comprising an identify of an incoming line, or trunk said plurality of SPPs comprising at least two SLPs;
    in one of said SPPs, assigning said call connection to any one of a plurality of at least three CPs (call processors), included in said plurality of SPPs for maintaining a control state for said call from origination to disconnect, and for controlling said call connection in said telecommunications network each of said plurality of SPPs comprising at least one CP;
    transmitting said call setup request messages from the receiving SLP to said assigned CP;
    transmitting an identity of the assigned CP to switch processor means for controlling a switching network fabric of a switch serving the incoming line or trunk;

transmitting connection request messages from said assigned CP to said switch for controlling said call connection from an incoming line or trunk of said call toward said destination within said switch to a destination or to another switch of said telecommunications network for extending said call toward a destination; and transmitting disconnect control messages from said assigned CP to said switch for disconnecting said call;

wherein said assigned CP maintains a control state, and retains control of said call and all calls controlled by said assigned CP from origination to disconnect;

wherein said assigned CP is connected to said switch by a data network for sending only signaling and control messages, and no voice band signals.

16. The method of claim 15 wherein said connection request messages comprise an identity of at least one trunk group identity, further comprising the step of:

said switch processor means selecting a trunk of said at least one trunk group for extending said call toward said destination.

17. The method of claim 15 wherein said telecommunications network comprises a plurality of SLPs, wherein said SLPs and said CPs are grouped into a plurality of SPPs (switching processing platforms), said SPPs each comprising a local data network for interconnecting processors of an SPP, wherein the step of transmitting said call setup request messages comprises the step of transmitting said call setup request messages over one of said local data networks.

18. The method of claim 17, wherein said telecommunications network comprises a plurality of switches and further comprises an interconnecting data network for interconnecting said SPPs and switches of said telecommunications network, and wherein the step of transmitting connection request messages comprises transmitting said connecting request messages over one of said local data networks and said interconnecting data network.

19. The method of claim 15 further comprising the step of:

said CPs further controlling the transmitting of connection request messages to an egress switch of said telecommunications networks.

20. The method of claim 15 further comprising the step of:

said CPs further receiving all trunk related common channel signaling messages for controlling the processing of said call.

* * * * *